US009029623B2

(12) United States Patent
Chen et al.

(10) Patent No.: US 9,029,623 B2
(45) Date of Patent: May 12, 2015

(54) PROCESS FOR ELIMINATING OR REDUCING PERSISTENT ORGANIC POLLUTANTS CONTAINED IN PARTICLES

(71) Applicant: Tongji University, Shanghai (CN)

(72) Inventors: Dezhen Chen, Shanghai (CN); Yuyan Hu, Shanghai (CN); Pengfei Zhang, Shanghai (CN); Lijie Yin, Shanghai (CN)

(73) Assignee: Tonji University (CN)

( * ) Notice: Subject to any disclaimer, the term of this patent is extended or adjusted under 35 U.S.C. 154(b) by 0 days.

(21) Appl. No.: 14/065,074

(22) Filed: Oct. 28, 2013

(65) Prior Publication Data
US 2014/0051902 A1    Feb. 20, 2014

Related U.S. Application Data

(63) Continuation-in-part of application No. PCT/CN2011/073562, filed on Apr. 29, 2011.

(51) Int. Cl.
| | |
|---|---|
| A62D 3/32 | (2007.01) |
| B09B 3/00 | (2006.01) |
| B09C 1/06 | (2006.01) |
| A62D 3/30 | (2007.01) |
| A62D 3/33 | (2007.01) |
| A62D 3/34 | (2007.01) |
| A62D 3/35 | (2007.01) |
| A62D 101/08 | (2007.01) |
| A62D 101/22 | (2007.01) |
| A62D 101/24 | (2007.01) |
| A62D 101/28 | (2007.01) |
| A62D 101/43 | (2007.01) |

(52) U.S. Cl.
CPC .............. B09B 3/0083 (2013.01); B09C 1/06 (2013.01); A62D 3/30 (2013.01); A62D 3/33 (2013.01); A62D 3/34 (2013.01); A62D 3/35 (2013.01); A62D 2101/08 (2013.01); A62D 2101/22 (2013.01); A62D 2101/24 (2013.01); A62D 2101/28 (2013.01); A62D 2101/43 (2013.01); A62D 2203/02 (2013.01); Y10S 588/901 (2013.01)

(58) Field of Classification Search
USPC ......... 588/312, 315, 313, 318, 405, 407, 412, 588/901
See application file for complete search history.

(56) References Cited

U.S. PATENT DOCUMENTS 6,090,291 A    7/2000    Akai et al.

FOREIGN PATENT DOCUMENTS

| | | |
|---|---|---|
| CN | 1683091 A | 10/2005 |
| CN | 101050862 A | 10/2007 |
| CN | 101690934 A | 4/2010 |
| WO | WO-2012/145930 A1 | 11/2012 |

OTHER PUBLICATIONS

"International Application Serial No. PCT/CN2011/073562, International Preliminary Report on Patentability dated Oct. 29, 2013", (w/ English Translation), 10 pgs.
"International Application Serial No. PCT/CN2011/073562, Written Opinion mailed Feb. 16, 2012", (w/ English Translation), 8 pgs.
Kluyev, N., et al., "Reductive dechlorination of polychlorinated dibenzo-p-dioxins by zerovalent iron in subcritical water", Chemosphere, 46, (2002), 1293-1296.
Mangialardi, T., et al., "Sintering of MSW fly ash for resuse as a concrete aggregate", Journal of Harzardous Materials B87, (2001), 225-239.
Shaojin, Chen, et al., "Experimental study of the dechlorination of PCBs in polluted soils by zero valent iron", (w/ English Abstract), Ecology and Environmental Sciences, 18(1), (2009), 193-196.
Xie, J., et al., "Hydrothermal treatment of MSWI fly ash for simultaneous dioxins decomposition and heavy metal stabilization", Front. Environ. Sci. Engin. China, 4(1), (2010), 108-115.
Yak, H. K., et al., "Reductive Dechlorination of Polychlorinated Biphenyls by Zerovalent Iron in Subcritical Water", Environmental Science & Technology, 33(8), (1999), 1307-1310.
Yamaguchi, H., et al., "Hydrothermal Decomposition of PCDDs/PCDFs in MSWI Fly Ash", Chemosphere, vol. 32, No. 1, (1996), 203-203.
Zhang, H,-J., et al,, "Stabilization of Heavy Metals in Municipat Solid Waste Incineration Fly Ash with the Thiol Collectors", (w/ English Abstract). Journal of Enviornmental Sciences, 28(8), (2007), 1899-1904.
Zhang, Q., et al., "A Study on Pretreatment of Fly Ash from Incineration before Solidification with Cement", (w/ English Abstract), Nonferrous Metals Engineering & Research, 28(2-3), (2007), 113-116.
Zhang, X.-H., et al., "New Process Development on MSW Fly Ash Utilization in Cement Kiln", (w/ English Abstract), Cement Technology, 3, (2007), 31-35.
Zhou, B., et al., "Selection of chemical stabilitization technologies for treatment of fly ash from municipal solid waste incineration (MSWI) to meet the new landfill standard", (w/ English Abstract), Journal of Environmental Sciences, 29(11), (2009), 2372-2377.
"International Application Serial No. PCT/CN2011/073562, International Search Report mailed Feb. 16, 2012", (w/ English Translaton), 4 pgs.

Primary Examiner — Edward Johnson
(74) Attorney, Agent, or Firm — Schwegman Lundberg & Woessner, P.A.

(57) ABSTRACT

A treatment process of persistent organic pollutants contained in particles is provided. Said process includes reacting persistent organic pollutant in particles under hydrothermal conditions in the presence of $Fe^{2+}$ and $Fe^{3+}$. Several beneficial effects can be achieved, including 1) no other additive is needed during the reaction process; 2) $Fe^{2+}$ and $Fe^{3+}$ are safe, cheap and extensive sources; 3) because $Fe^{2+}$ and $Fe^{3+}$ are dissolved, they can fully disperse into particles, and fully contact can be achieved, thus obtaining a decomposition rate no less than 70% of the persistent organic pollutants is under subcritical conditions.

13 Claims, No Drawings

PROCESS FOR ELIMINATING OR REDUCING PERSISTENT ORGANIC POLLUTANTS CONTAINED IN PARTICLES

CROSS-REFERENCE TO RELATED APPLICATION

This application is a continuation-in-part patent application of International Application No. PCT/CN2011/073562, filed Apr. 29, 2011. The disclosure of that application is incorporated herein by reference.

FIELD OF THE INVENTION

The present invention belongs to the technical field of harmless treatment of hazardous solid waste, and specifically relates to a process for treating persistent organic pollutants such as dioxins, organochlorine pesticides, polychlorinated biphenyls (PCBs), polybrominated biphenyls (PBBs) and polybrominated diphenyls ethers (PBDEs) contained in particles by hydrothermal reaction.

BACKGROUND OF THE INVENTION

Persistent organic pollutants, POPs for short, are a class of compounds that may be seriously harmful to the environment and human health. They are characterized mainly by toxicity, nondegradable, mobility, bioaccumulation and bioconcentration. POPs are harmful to humans and animals even at a very low exposure extent. POPs pollution has become a global environmental problem.

Incineration is an important method for wastes' disposal. Fly ashes from the wastes' (including domestic wastes, industrial wastes and medical wastes) incineration generally contain a relatively higher concentration of heavy metals and a certain concentration of dioxins. With the wide application of incineration technology for treating the municipal solid wastes, the amount of fly ash generated from the incinerator is increasing. Dioxins are a class of colorless, odorless, fat-soluble substances with serious toxicity. They are two major kinds of organic compounds having very similar structures and properties and including a number of congeners, whose chemical name are respectively called polychlorinated dibenzo-on-dioxins (PCDDs) and polychlorinated dibenzo-furans (PCDFs), generally named as PCDD/Fs. Their families of total 210 isomers are important species of persistent organic pollutants (POPs), which exist in the incineration fly ashes and contaminated soils, and they are difficult to be decomposed at ambient temperatures.

In addition, the organochlorine pesticide pollution becomes increasingly serious in China. Organochlorine pesticides (OCPs), mainly including Hexachlorocyclohexane (HCH), dichlorodiphenyltrichloroethane (DDT) and Hexachlorobenzene (HCB), are all made by a chlorination of benzene as raw material. All of them belong to the categories of persistent organic pollutants (POPs). After used, the residual OCPs in soil will be transferred to the water and contaminate the drinking water, or even be transferred to the replanted crops. Pollutants which are similar to the above mentioned pollutants also include Polychlorinated biphenyls (PCBs), also known as chlorinated biphenyl, formed by the linkage of two benzene rings and the substitution of one to ten chlorine atoms for carbon atoms of the benzene rings. There are 209 kinds of isomers in their family, wherein, 12 kinds of coplanar PCBs are toxic. The World Health Organization stipulates the toxic equivalent factor for these 12 kinds of coplanar PCBs, similar to dioxins, so also called dioxin-like PCBs. They have been used extensively in electric devices such as capacitors and transformers as insulating oil due to their chemical stability, favorable thermal conductivity and good insulativity. They were produced in China and many other countries in the world and have been prohibited from the 1970s. However, it is estimated that the total amount of PCBs that exist in ocean, soil and atmosphere in the world reaches more than 25-30 million tons with an extensive pollution since they are difficult to be decomposed.

PBBs and PBDEs are similar to PCBs in properties such as structure, bioconcentration, toxicity and so on, which are the most widely used brominated flame retardants in industry, such as furnitures, textiles, chemicals, electronics, etc. Since they are additive flame retardants without being bound with chemical bonds and would release into the environment by way of volatilization, effusion and the like, they lead to the pollution of air, water, soil and biosphere. Tetrabromodiphenyl ether, pentabromodiphenyl ether, hexabromodiphenyl ether and heptabromodiphenyl ether are listed officially in Stockholm Convention by United Nations Environment Programme in May, 2009. The chemicals used as flame retardants are hexabromo-, octabromo-, nonabromo- and decabromo-compounds. The concentrations of PBBs and PBDEs in the tested environmental samples are higher than PCBs' and they are still used in large quantities, which makes it increase continuously. Therefore, PBBs and PBDEs, with tumorigenic and carcinogenic properties as dioxins, have become one class of the important pollutants. There are still no economical and reliable degradation methods in the prior art.

The current methods for treating the persistent organic pollutants mainly include high temperature processing, supercritical fluid extraction (SCFE), supercritical water oxidation (SCWO), degradation by ultraviolet light, biodegradation, the technique of reductive dechlorination by zero-valent iron, the moderate and low temperature heat reduction processing, and catalytic reduction etc. These methods all have some defects or limitations. For example, the high temperature processing, including melting-vitrification and sintering, can destroy dioxins and prevent their re-synthesis under well-controlled conditions, but the energy consumption is very high and the treatment for the secondary dust and smoke is needed, whereby the cost of the treatment is high and it is difficult for popularizing and implementing.

The relatively effective method for treating the persistent organic pollutants is supercritical water oxidation. For example, CN Patent ZL200510075433.4 disclosed a method of supercritical water oxidation, which is quite effective for the treatment of waste solutions containing toxic organics. Organic compounds, oxygen and water form a single homogeneous phase under the supercritical reaction conditions ($T_c \geq 373.95°$ C., $P_c \geq 20.64$ bar), allowing the oxidation reaction to be quickly performed to effectively destroy organics such as PCDD/Fs. However, the cost and maintenance fee of the reactor is very high when this technique is used as meeting the requirements of engineering design and operation.

Supercritical water has a high ability of dissolving organics, but a low ability of dissolving inorganics. The pharmaceutical in inorganic particles cannot react well in supercritical liquid, unless obtaining a very good dispersion. The other problem in supercritical conditions includes, for example, dioxin-like pollutants contained in fly ash can be oxidized under the supercritical conditions, but the salt in fly ash may precipitate and scale on the wall surface, thus arousing difficulties in the maintenance of the reactor. In order to exert the ability of water for dissolving and destroying organics at high temperature, but to avoid strict requirements for reaction condition or equipment, researchers give an idea that dioxin-like substances are decomposed under subcritical and even high-temperature hydrothermal conditions. The higher the temperature of water is, the greater the ion activity product thereof is, and the higher the ability of oxidation or decomposing to organics is. Therefore the decomposing and oxidation to toxic organics such as dioxins under high-temperature hydrothermal conditions or subcritical conditions are not as good as that under supercritical conditions. High efficiency of decomposing or oxidizing organic pollutants is highly needed under high-temperature hydrothermal conditions or subcritical conditions. CN Patent 200710040771.3 disclosed a method of hydrothermal treatment of waste incineration fly ash, specifically including that the hydrazine substance is added to facilitate the decomposition of dioxin in the hydrothermal reaction for treating dioxins contained in waste incineration fly ash, and including the technique of anti-corrosion of wall surface. This method facilitates the decomposition of dioxin under subcritical conditions, but pre-decomposition of hydrazine is needed to be prevented when the method is implemented, and a certain rate of cooling is needed.

In addition, the technique of reductive de-chlorination by zero-valent iron is in the prior art, which can be implemented not only at room temperature (Chen Shaojin, Liang Hesheng, Experimental Study of the Reductive De-chlorination of PCBs in Polluted Soils by Zero Valent Iron, Ecology and Environmental Sciences 2009, 18(1): 193-196), but also under hydrothermal conditions (YAK H K, WENCLAWIAK B W, CHENG I F, et al. Reductive de-chlorination of polychlorinated biphenyls by zero-valent iron in subcritical water, Environmental Science and Technology, 1999, 33: 1307-1310; Nikolay Kluyev, Andrei Cheleptchikov et al., Reductive de-chlorination of polychlorinated dibenzo-p-dioxins by zero valent iron in sub-critical water, Chemosphere 2002, 46: 1293-1296). However, the zero-valent iron ($Fe^0$) of solid state in the mixture of water/particles cannot get good contact with particles, the dissolved PCDD/Fs, PCBs and other pollutants, thus the improvement of efficiency is limited. Moreover, hydrogen is often generated when $Fe^0$ exists in the subcritical water, bringing a risk of increased pressure in the reaction vessel and a potential danger in operation. In addition, the technique of reductive de-chlorination by zero-valent iron is hardly to be used for the de-chlorination of PCBs and dioxins with less chlorine substitutions, and only can be used for the de-chlorination of PCBs and dioxins with more chlorine substitutions. De-chlorination reaction is carried out on the surface of zero-valent iron particles. When particles (such as multi-hole particles as active carbon in incineration fly ash) have a high ability of absorption for PCBs and dioxins, the absorbed dioxins and PCBs, PBBs, PBDEs and halogenated polycyclic aromatic hydrocarbons have no chance to react with zero-valent iron.

In order to treat the organic pollutants in solid particles more economically, safely and efficiently, those skilled in the art devote themselves to developing a process for eliminating or reducing the organic pollutants like dioxins, organochlorine pesticide and PCBs, PBBs and PBDEs contained in solid particles.

SUMMARY OF THE INVENTION

The purpose of the invention is to provide a convenient, efficient process to eliminate persistent organic pollutants such as dioxins, organochlorine pesticides, PCBs, PBBs or PBDEs contained in particles under hydrothermal conditions.

The purpose of the invention can be realized through the following process.

Specifically, the process for eliminating or reducing persistent organic pollutants contained in the particles in this invention comprising treating the persistent organic pollutants in the particles under hydrothermal conditions in the presence of Fe2+ and Fe3+. The persistent organic pollutants mentioned in the invention are mainly dioxins, organochlorine pesticides, PCBs, PBBs or PBDEs. The persistent organic pollutants in the particles are eliminated by a reaction under subcritical or below-subcritical hydrothermal conditions.

Under the hydrothermal conditions, $Fe^{2+}$ and $Fe^{3+}$ are added into the reaction system in situ react to generate new, active $FeO_xO_y$ and insoluble $Fe_3O_4$, having a high ability to catalyze the decomposition of dioxin-like pollutants, organochlorine pesticide, PCBs, PBBs and PBDEs. Since they are produced from a liquid of $Fe^{2+}$ and $Fe^{3+}$, they can get full contact with the particles containing dioxins, organochlorine pesticides and PCBs and achieve an optimum result and maximize the elimination to dioxins, organochlorine pesticides, PCBs, PBBs and PBDEs.

The process of the invention is performed under subcritical conditions or below-subcritical conditions (the temperature being below 373.95° C. and the pressure being below 220.64 bar) to maximize the elimination to the persistent organic pollutants, and the percentage of decomposition is no less than 70%.

In the process of the invention, the contaminated particles, water, $Fe^{2+}$ salt and $Fe^{3+}$ salt are formed to a mixture of slurry, which are reacted under subcritical or below-subcritical conditions, preferably at the temperature of 180-300° C. The subcritical or below-subcritical conditions are conditions including that the saturation pressure and temperature are below or far from the critical values. In fact, the process disclosed in this invention can eliminate the organic pollutants more or less, as long as in the presence of $Fe^{2+}$ and $Fe^{3+}$ under hydrothermal conditions, no matter what temperature is set. When the temperature is high, it is difficult to implement in engineering; and when the temperature is low, the reaction will be very slow and it will be take relatively longer reaction time to achieve the expected result, which is uneconomic. Therefore, the reaction is performed preferably at the temperatures of 180-300° C.

In the process of the invention, the preferred molar ratio of the $Fe^{2+}$ to $Fe^{3+}$ is 1:4~3:1, more preferably 1:3~1.5:1. The closer to 1:4 the molar ratio of $Fe^{2+}$ to $Fe^{3+}$ is, the higher (being positive, the larger the positive value is) the oxidation-reduction potential (ORP) of the mixture of slurry formed by the particles and the water is, i.e. the higher its ability of oxidization is. The closer to 3:1 the molar ratio of $Fe^{2+}$ to $Fe^{3+}$ is, the lower (being negative, the larger the negative value is) the oxidation-reduction potential (ORP) of the mixture of slurry formed by the particles and the water is, i.e. the higher the reducing ability of the mixture of slurry is.

In the process of the invention, the more the total amount of the used Fe2+ and Fe3+ is, the better the pollutants will be decomposed. However, in view of the factors such as controlling the cost and adjusting the pH of the system, the total amount of mentioned Fe2+ and Fe3+ is preferably 1 wt %~8 wt % of the particles.

In an embodiment of the process of the invention, the contaminated particles are mixed with Fe2+ salt and Fe3+ salt firstly, and then mixed with water; or the particles are mixed with the water firstly, and then the mixture of Fe2+ salt and Fe3+ salt is added or Fe2+ solution and Fe3+ solution are added separately, the amount of Fe2+ and Fe3+ to be added is also regulated with the aid of ORP meter so as to maintain the ORP between −300 mv and 300 mv, stirred to form a mixture of slurry, and then heated and reacted at a temperature of 180-300° C., so that the said pollutants in the said contaminated particles can get full contact with Fe2+ and Fe3+ to facilitate their decomposition reaction. (i.e. dioxins, organochlorine pesticides, PCBs, PBBs and PBDEs are decomposed).

In the process of the invention, the purpose of addition of water is to create hydrothermal reaction conditions. Those skilled in the art can determine a reasonable amount of added water based on the conditions of the hydrothermal reaction. The weight ratio of the particles to the water is preferably 1:1~1:5, and more preferably 1:1.5~1:3.5.

In the process of the invention, there is no special requirement for the donor of the Fe2+ and the Fe3+. The compound, salt or the hydrate thereof, which can provide the Fe2+ and Fe3+, or the solution containing Fe2+ and Fe3+ can all be used. Preferably, the Fe2+ salt is selected from one or several varieties of a ferrous sulfate, a ferrous chloride, a ferrous nitrate or the hydrates thereof; and the Fe3+ salt is selected from one or several varieties of a ferric sulfate, a ferric chloride, a ferric nitrate and the hydrates thereof. The donor of Fe2+ and Fe3+ are not limited to the above list of ferrous or ferric salt, other solutions containing iron ion such as spent pickling solution containing iron (mainly Fe2+) produced in acid-washing the ironwork can also be used as donors of Fe2+ and Fe3+.

In the process of the invention, in order to avoid the rapid evaporation of a large amount of water, preferably, the mixture of slurry is reacted in a sealed vessel or under pressure control, and the residual water in the reactor is no less than 5 wt % after the reaction. In one embodiment, the content of water in the reaction mixture is determined mainly through the controlled deflation (steam bleeding) and controlling the reaction temperature to not exceed the saturation temperature of water at corresponding pressure with a proper temperature difference.

In the process of the invention, preferably, the mixture of slurry is reacted for 20-200 minutes, so that the percentage of decomposition of the persistent organic pollutants contained in the particles is no less than 70%. For example, toxic equivalence quantity of dioxin decreases by 70% or more, or the percentage of decomposition of organochlorine pesticides and toxic PCBs, PBBs and PBDEs is no less than 70%.

The process of the invention can be performed in the reactor that is suitable for hydrothermal reaction, preferably in a reactor of high-temperature and sealed or a reactor of pressure control.

In a preferred embodiment of the process of the invention, the following steps are further included: the reacted mixture being cooled; and then a solid-liquid separation of the reacted mixture being carried out by directly keeping the retained liquid of the reacted mixture and by a spontaneous evaporation of water, or by filtration, pressure filtration or centrifugation; and the obtained filter cake being kept till the requirement of moisture content is met and then used as building material or disposed directly in landfill.

When the particles contain heavy metallic pollutants, the process of the invention can also incorporate the heavy metals stabilization technique in the prior art, using common heavy metal stabilizers to stabilize the heavy metallic pollutants, which further controls the leaching of heavy metals, such as the techniques disclosed in: Zhang Qing, Chen Dezhen etc., A Study on Pretreatment of Fly Ash from Incineration before Solidification with Cement, Nonferrous Metals Engineering & Research, 2007, 28 (2-3): 113-116+130; Zhou Bin, Hu Yuyan etc., Selection of Chemical Stabilization Technologies for Treatment of Fly Ash From Municipal Solid Waste Incineration to Meet The New Landfill Standard, Journal of Environmental Sciences, 2009, 29 (11): 2372-2377; Zhang Haijun, Yu Ying etc., Stabilization of Heavy Metals in Municipal Solid Waste Incineration Fly Ash With the Thiol Collectors, Journal of Environmental Sciences, 2007, 28(8): 1899-1904; China Patent Application 200910197214.1, 'Method for Stabilizing Fly Ash from Refuse Incineration by Combination of Complementary Type Medicaments' and so on.

Preferably, the reacted particles-water mixture is mixed with heavy metallic stabilizers after being cooled to stabilize the heavy metals; or is used as raw material for cement burning (as disclosed in Zhang Xinhui, Shi Huisheng, New Process Development on Municipal Solid Waste Incineration Fly Ash, Cement Technology, 2007, (3):31-35) or used as building material after being sintered (T. Mangialardi, Sintering of MSW fly ash for reuse as a concrete aggregate, Journal of Hazardous materials. 2001, B87:225-239).

In one embodiment of the invention, the process comprises steps as following:

(1) the particles containing PCDD/Fs, organochlorine pesticides, PCBs, PBBs and PBDEs (such as incineration fly ash, contaminated soil, sediment and bottom mud etc.) are mixed with divalent ferrous salt and trivalent ferric salt and then water is added for mixing, or the particles are mixed with water and then the solution containing Fe2+ and solution containing Fe3+ are added separately for mixing, or the particles are mixed with the aqueous solution containing Fe2+ and the aqueous solution containing Fe3+ directly, the final weight ratio of the particles to water is 1:1~1:5 and the molar ratio of Fe2+ to Fe3+ is 1:4~3:1 and the total amount (Fe2+ and Fe3+) is 1.0 wt %~8 wt % of the particles; and the amount to be added is also regulated with the aid of ORP meter so as to maintain the ORP between −300 mv and 300 mv.

(2) the above mixture is transferred into a high-temperature reactor and the mixture in the reactor is heated to 180-300° C., and then it is reacted for 20-200 minutes under a condition of sealing or pressure control;

(3) after the reaction, the reactant is discharged after being cooled; and (4) the leaching of other contained heavy metals can be further adjusted as needed.

In the process of the invention, the meanings of the terms used are as follows.

The term of "persistent organic pollutants" denotes PCDD/Fs, organochlorine pesticides, polychlorinated biphenyls PCBs, polybrominated biphenyls PBBs or polybrominated diphenyls ethers PBDEs, or substances that have the similar structures and properties to PCDD/Fs, for example, one of the Cl in them was substituted by fluorine (F) or bromine (Br); The organochlorine pesticides include hexachlorocyclohexane (HCH), dichlorodiphenyltrichloroethane (DDT) and hexachlorobenzene (HCB) etc.

The particles can be incineration fly ash generated from a waste (domestic, medical and industrial) incinerator, or be soil, sediment or bottom mud containing PCDD/Fs, organochlorine pesticides, PCBs, PBBs and PBDEs or the soil which needs to be remedied in an out-of-use landfill, or contaminated bottom mud of a river channel and contaminated sediment in a gulf.

The term of "hydrothermal conditions" denotes the conditions that the particles and water are mixed to form the slurry and the pressure of the reaction system and the saturation temperature of the aqueous phase are associated with each other directly; namely the temperature of the system is the saturation temperature corresponding to the above pressure.

The terms of "Fe2+" and "Fe3+" denote the iron ions of divalent and trivalent valence state respectively.

The terms of "mixture of slurry" denotes the liquid-solid mixture formed by particles, divalent and trivalent iron ions and water.

The treatment or elimination of the persistent organic pollutants means the process that the dioxins, organochlorine pesticides, PCBs, PBBs and PBDEs are transformed into non-toxic, easily decomposed substances after dechlorination or halogen. For example, 17 kinds of toxic dioxin compounds are transformed into non-toxic, easily decomposed substances after dechlorination, and other dioxin-like substances are transformed into ones with relatively unstable structures; and organochlorine pesticides and 12 kinds of toxic PCBs are deprived of chlorine atoms on the benzene ring, halogenated polycyclic aromatic hydrocarbons are deprived of halogen atoms such as chlorine and bromine etc.

The water could be soft water for industrial use, native river water, other fresh water, or tap water without disinfected by chlorine.

The benefits of the process of the invention include the follows.

1) In the process of the invention, the ferrous ion and ferric ion exist in a dissolved state before reaction and are distributed adequately on the surface of the particles, allowing the most sufficient contact and allowing the reaction to be carried out in the entire particles without being affected by the factor of absorption and other conditions, which cannot be realized when zero-valent iron is used.

2) In the process of the invention, the used compounds of Fe2+ and Fe3+ are cheap, safe and widely available, and even the Fe2+ and Fe3+ from a waste liquor can be used.

3) In the process of the invention, no other eliminating or reducing agent is required during the reaction, which facilitates the safe operation and maintenance of the reactor.

4) Comparing with any other process in which the catalyst is added exteriorly to the contaminated particles or during the reaction process, the operation of the process of the invention is simpler and the effect of the process of the invention is better. Moreover, the reaction products will attach to the contaminated particles, which prevent other possible contamination such as the leaching of heavy metals well, and the separation is not needed.

5) The invention provides a simple, economical decomposition process for the dioxins toxic organics, organochlorine pesticides, PCBs, PBBs and PBDEs contained in particles, which has a quite good implementation result.

PREFERRED EMBODIMENTS

The following specific examples will be used to specify the embodiments and effects of the invention.

In the following specific examples of the invention, the term of "concentration of toxic dioxins" denotes the total concentration of 17 kinds of toxic dioxin isomers, and the term of "total concentration of PCDD/Fs" denotes the concentration of 210 kinds of dioxin isomers, and the term of "concentration of toxic equivalent quantity (TEQ)" denotes the toxic equivalent quantity which is the sum of the products of the concentrations of toxic dioxins multiplied by the corresponding toxic equivalency factors.

The result report of the general standard detection method (such as the EPA 1613 method of USEPA and JIS K0311 method used in Japanese industry), in which the high resolution chromatography & mass spectrometry combination detection, that is, the HRGC/HRMS method is used, generally shows only the concentration of 17 kinds of toxic dioxin isomers and the concentration of toxic equivalent quantity. However, this detection method can also be used to detect the total concentration of 210 kinds of isomers. In the process of the invention, the total concentration of 210 kinds of isomers was also detected via this detection method.

As to organochlorine pesticides and PCBs, their mass concentration were mainly used, detected via USEPA METHOD 508.1, that is, gas chromatography method of electron capture detector (ECD) was used.

There are no standard detection methods for halogenated polycyclic aromatic hydrocarbons at present. The total amount and the separate amount of each kind of isomer were detected by the high resolution chromatography & mass spectrometry via EPA 1613 method of USEPA. The monobromo-, dibromo-, tribromo, tetrabromo-, pentabromo-, hexabromo- and heptabromo-PBBs and PBDEs were analysed by Electro-Impact source gas chromatography & mass spectrometry (GC-EI/MS). The octabromo-, nonabromo- and decabromo-PBBs and PBDEs were analysed by negative chemical ionization gas chromatography & mass spectrometry (GC-NCI/MS).

In the specific examples of the invention, the leaching of heavy metals of the treated particles was detected according to the PRC environmental protection industrial standard of HJ/T 300-2007, as 'Solid Waste Extraction Leaching Toxicity Procedure for Leaching Acetic Acid Buffer Solution Method'.

In the specific examples of the invention, except for the spent pickling solution containing iron which was described particularly to be used, the used iron salts were the commercially available products.

EXAMPLE 1

The dioxins organic pollutants contained in incineration fly ash, in which the concentration of toxic dioxins was 11463.3 ng/kg and the total concentration of PCDD/Fs was 47540 ng/kg and the concentration of toxic equivalent quantity was 628.8 ng-TEQ/kg, were treated and destroyed.

The incineration fly ash and water were mixed at a weight ratio of 1:2, then FeSO4 and Fe2(SO4)3 were added at a molar ratio of 1:2 (for Fe2+/Fe3+); and the addition of Fe2+ was followed after the addition of Fe3+, to keep the ORP value reach to 200 mv approximately and the total weight of Fe2+ and Fe3+ be around 5 wt % of the weight of incineration fly ash, mixed and stirred in a mixer to form a mixture of slurry. The mixture of slurry was transferred into a hydrothermal reactor. The reaction temperature in the high temperature reactor was set at 290° C. and the pressure in this reactor was set at 74.42 bar. Reaction was proceeded for 1 hour and then the slurry was cooled.

The reacted mixture of slurry was dried at the temperature of 80° C. and the dioxins were detected. The results were as follows: the concentration of toxic dioxins was 436.5 ng/kg, and the concentration of toxic equivalent quantity was 53.9 ng-TEQ/kg, and the total concentration of PCDD/Fs was 3056 ng/kg, and the total percentage of decomposition of dioxins was no less than 90%.

CONTROL EXAMPLE 1

Only saturated FeSO4 solution or only saturated Fe2(SO4)3 solution was added to treat the incineration fly ash which is the same as that in Example 1, and the weight of Fe2+ or Fe3+ was 5 wt % of the weight of incineration fly ash.

While only FeSO4 was added, the concentration of toxic equivalent quantity of the treated incineration fly ash was 143 ng-TEQ/kg, which was 167% higher than that in Example 1; and the total concentration of toxic dioxins was 1434 ng/kg, which was 229% higher than that in Example 1.

While only saturated Fe2(SO4)3 was added, the concentration of toxic equivalent quantity of treated incineration fly ash was 300 ng-TEQ/kg, which was 457% higher than that in Example 1; and the concentration of toxic dioxin was 2316 ng/kg, which was 431% higher than that in Example 1.

EXAMPLE 2

The incineration fly ash which was the same as that in Example 1 was treated. After treatment (treatment by agent and through the separation of waste water) for stabilizing heavy metals at room temperature, the concentration of contained toxic dioxins was 11594.5 ng/kg, and the concentration of toxic equivalent quantity was reduced to 558 ng-TEQ/kg, and the total concentration of PCDD/Fs was 48019 ng/kg. The process of the present invention was used to destroy the dioxins.

The incineration fly ash and water were mixed at a weight ratio of 1:1.5, then saturated FeSO4 solution and saturated Fe2(SO4)3 were added at a molar ratio of 1:1 (for Fe2+/Fe3+); and the addition of Fe2+ was followed after addition of Fe3+, to keep the ORP value be positive and finally the total weight of Fe2+ and Fe3+ be around 3 wt % of the weight of fly ash, stirred to allow sufficient contact to form a mixture of slurry. The mixture of slurry was transferred into a high temperature reactor. The reaction temperature in the high temperature reactor was set at 290° C. Reaction was proceeded for 60 minutes and then the slurry was cooled.

The reacted mixture of slurry was dried at the temperature of 80° C. and the dioxins were detected. The results were as follows: the concentration of toxic dioxins was 820 ng/kg, and the concentration of toxic equivalent quantity was 85 ng-TEQ/kg, and the total concentration of PCDD/Fs was 18999 ng/kg, and the percentage of decomposition of dioxin toxic equivalent quantity was 84.8%.

EXAMPLE 3

The incineration fly ash which was the same as that in Example 2 was treated. While the process of the invention was used to destroy the contained dioxins, the incineration fly ash and water were mixed at a weight ratio of 1:1.5, then FeSO4 aqueous solution and Fe2(SO4)3 aqueous solution were added at a molar ratio of 1:1 (for Fe2+/Fe3+); and the addition of Fe2+ was followed after addition of Fe3+, to keep the ORP value reach to positive and finally the total weight of Fe2+ and Fe3+ be around 1 wt % of the weight of fly ash. The reaction temperature in the subcritical hydrothermal reactor was set at 300° C. Reaction was proceeded for 20 minutes and then the slurry was cooled.

The reacted mixture of slurry was dried at the temperature of 80° C. and the dioxins were detected. The results were as follows: the concentration of toxic dioxins was 713 ng/kg, and the concentration of toxic equivalent quantity was 80.1 ng-TEQ/kg, and the total concentration of PCDD/Fs was 9891 ng/kg, and the percentage of decomposition of dioxin toxic equivalent quantity was 85.6%.

EXAMPLE 4

The incineration fly ash from an incineration plant was treated, in which the dioxin content was 3900 ng I-TEQ/kg, and the concentration of toxic dioxins was 13555 ng/kg.

While the process of the invention was used to destroy the dioxins, the incineration fly ash and water were mixed at a weight ratio of 1:1.8, then FeSO4 solution and saturated Fe2(SO4)3 solution were added at a molar ratio of 2.5:1 (for Fe2+/Fe3+); and the addition of Fe2+ was followed after addition of Fe3+, to keep the ORP value not below −300 mv and finally the total weight of Fe2+ and Fe3+ be around 8 wt % of the weight of fly ash.

The formed mixture of slurry was transferred into a hydrothermal reactor and the reaction temperature in the reactor was set at 290° C. Reacted for 75 minutes and then cooled. The reacted mixture of slurry mixture was dried at the temperature of 80° C. and the dioxins were detected. The results were as follows: the concentration of toxic dioxins was 656 ng/kg, and the concentration of toxic equivalent quantity was 71 ng-TEQ/kg, and the total concentration of PCDD/Fs was 2189 ng/kg, and the percentage of decomposition of dioxin toxic equivalent quantity was 98%.

EXAMPLE 5

The incineration fly ash of an incineration plant was treated, in which the dioxin content was 422 ng I-TEQ/kg and the total concentration of 17 kinds of toxic dioxin isomers was 4963 ng/kg.

While the process of the invention was used to destroy the dioxins, the incineration fly ash and water were mixed at a weight ratio of 1:1.8, then the Fe(NO3)2 solution and Fe2(NO3)3 solution were added at a molar ratio of 1:2 (for Fe2+/Fe3+); and the addition of Fe2+ was followed after that of Fe3+, to keep the ORP value not below 100 mv and the total weight of Fe2+ and Fe3+ be around 7 wt % of the weight of fly ash.

The formed mixture of slurry was transferred into a reactor. The reaction temperature in the reactor was 240° C. The reacted mixture of slurry was cooled after reacted for 72 minutes. A small amount of sample was dried and then leached according to the standard HET 300 method. The leaching of heavy metal lead (Pb) was 1.15 mg/L, thus disodium hydrogen phosphate of 1 wt % was added after the mixture of slurry was cooled to stabilize the heavy metals.

The treated mixture was dried at the temperature of 80° C., and the dioxins were detected, and the leaching detection was performed according to the standard HJ/T 300 method. The results were as follows: the concentration of toxic dioxins was 1600 ng/kg, and the concentration of toxic equivalent quantity was 100 ng-TEQ/kg, and the percentage of decomposition of dioxin toxic equivalent quantity was 76.3%. The leaching of Pb was 241 ug/L.

EXAMPLE 6

The soil in some place was contaminated by PCBs, and the concentration of PCBs was detected as 11 mg/kg. While the process of the invention was used to treat the organic pollutants, the soil and water were mixed at a weight ratio of 1:3.5, then saturated FeSO4 solution and Fe2(NO3)3 solution were added at a molar ratio of 1:2.5 (for Fe2+/Fe3+); and the addition of Fe2+ was followed by the addition of Fe3+, to keep the ORP value be positive and finally the total weight of Fe2+ and Fe3+ was around 6 wt % of the weight of the soil. A small amount of lime was added to adjust the pH to 8~9.6.

The formed mixture of slurry were transferred into a hydrothermal reactor and the reaction temperature in the hydrothermal reactor was set at 300° C. The mixture of slurry of soil and water was cooled after reacted for 200 minutes.

The reacted mixture was dried at the temperature of 40° C., then the PCBs and the total of PCDD/Fs were detected. The results were as follows: the concentration of PCBs was 72 ug/kg, and the total concentration of PCDD/Fs was not detected, and the percentage of decomposition of PCBs was 99.3%.

EXAMPLE 7

The soil in some place was contaminated after a long-time use of pesticide. The total content of DDT was 57.6 ug/kg, and the total content of HCH was 50.6 ug/kg, and the total content of HCB was 12.2 ug/kg. While the process of the invention was used to treat the contaminated soil, the soil and water were mixed at a weight ratio of 1:5, then saturated $FeCl_2$ solution and saturated $Fe_2(SO_4)_3$ solution were added simultaneouly at a molar ratio of 1:3.5 (for $Fe^{2+}/Fe^{3+}$), to keep the ORP value to be around 300 mv and finally the total weight of $Fe^{2+}$ and $Fe^{3+}$ be around 8 wt % of the weight of the contaminated soil. A small amount of lime was added to adjust the pH of the system to 6~7.5.

The formed mixture of slurry was transferred into a high temperature reactor. The reaction temperature in the high temperature reactor was set at 180° C. and the reaction pressure in the high temperature reactor was set at 10 bar. The mixture of slurry of soil and water was cooled after reacted for 200 minutes.

The reacted mixture was dried at the temperature of 40° C., and the total content of DDT, HCH and HCB were detected. The results were as follows: the total content of DDT was 16.2 ug/kg, and the total content of HCH was 14.6 ug/kg, and the total concentration of HCB was 3.6 ug/kg, and the total percentage of decomposition of organochlorine pesticides was 71.4%.

EXAMPLE 8

In the gas purification system of an industrial refuse incineration plant, the semidry process was used and the bag filter was used to collect the dust. One ton of fly ash was generated per day. It's detected that the content of dioxins in the fly ash was as high as 6500 ng I-TEQ/kg, and the concentration of toxic dioxin was 24630 ng/kg.

While the process of the invention was used to treat the dioxins, the spent pickling solution, which was generated in washing the wire rope with dilute sulfuric acid in the wire rope plant adjacent to the incineration plant and contained 13 g/L of $Fe^{2+}$, was used to be mixed with the incineration fly ash to reach a concentration that the weight ratio of fly ash to water was 1:2. Then $Fe_2(SO_4)_3$ solid was added at a molar ratio of 1:2 (for $Fe^{2+}/Fe^{3+}$), and the concentration of $Fe^{3+}$ was adjusted to keep the ORP value not below 150 mv and the total weight of $Fe^{2+}$ and $Fe^{3+}$ be around 7.8 wt % of the weight of fly ash.

The formed mixture of slurry was transferred into a hydrothermal reactor. The reaction temperature in the hydrothermal reactor was 300° C. The mixture of slurry was cooled after reacted for 65 minutes. A small amount of sample was dried and then leached according to the standard HJ/T 300 method. The leaching of heavy metal Pb was 2.1 mg/L, thus the commercially available heavy metal stabilizer TMT-18 of 1.5 wt % was added after the mixture of slurry was cooled to stabilize the heavy metals.

The treated mixture was dried at the temperature of 80° C. and the dioxins were detected, and the leaching test was performed according the standard HJ/T 300 method. The results were as follows: the concentration of toxic dioxins was 246.4 ng/kg, and the concentration of toxic equivalent quantity was 99 ng-TEQ/kg and the total percentage of decomposition of the 17 kinds of toxic dioxins was 99%; and the percentage of degradation of dioxin toxic equivalent quantity was 98.5%. The leaching of Pb was 191 ug/L. The treated incineration fly ash has met the requirements for sanitary landfill.

EXAMPLE 9

The fly ash from industrial refuse incineration plant described in Example 8 was treated. The subcritical hydrothermal reaction at 300° C. was performed and the zerovalent iron powder with a weight being 7.2 wt % of the weight of fly ash was added. In the course of the process, it's found that the pressure was increasing continuously at the temperature of 300° C. It was needed to discharge the gas incessantly. After reaction for 1.5 hours, the cooling was performed according to one of the two methods of: 1) flash evaporation and rapid cooling, in which a baghouse dust collector is needed behind to prevent the dust escaping; and 2) slow cooling through filling water in water-cooling jacket of the reactor. The cooling was completed until the temperature reached at 40° C., and then the drying was performed. It's found by detection that: 1) in the fly ash cooled by rapid cooling (method 1) after the treatment, the concentration of 17 kinds of toxic dioxins was 3364 ng/kg, and the concentration of toxic equivalent quantity was 909 ng-TEQ/kg, and the total percentage of decomposition of the 17 kinds of toxic dioxins was 86.3%, and the percentage of decomposition of dioxin toxic equivalent quantity was 86%; and 2) in the fly ash cooled by slow cooling after the treatment, the concentration of 17 kinds of toxic dioxins was 3104 ng/kg, and the concentration of toxic equivalent quantity was 1107 ng-TEQ/kg, and the total decomposition rate of the 17 kinds of toxic dioxins was 87.4%, and the percentage of decomposition of dioxin toxic equivalent quantity was 83%. While the process of the invention was used to treat the dioxins, the $FeSO_4.7H_2O/Fe_2(SO_4)_3$ solid was mixed with the incineration fly ash and then water was added to reach a concentration that: 1) the molar ratio of $Fe^{2+}/Fe^{3+}$ was 1:2, and 2) the radio of fly ash to water was 1:3, and 3) the total weight of $Fe^{2+}$ and $Fe^{3+}$ was around 7.2 wt % of the weight of fly ash.

The formed mixture of slurry was transferred into a subcritical hydrothermal reactor. The temperature in the reactor was 300° C. The pressure is essentially stable during the process of reaction. After reaction for 65 minutes, the reacted mixture of slurry was also cooled via one of the two methods: 1) flash evaporation and rapid cooling, in which a baghouse dust collector is needed behind to prevent the dust escaping; 2) slow cooling through filling water in water-cooling jacket of the reactor; and dried after cooled. It's found by detection that: 1) in the fly ash cooled by rapid cooling after the treatment, the concentration of 17 kinds of toxic dioxins was 249.8 ng/kg, and the concentration of toxic equivalent quantity was 130 ng-TEQ/kg, and the total percentage of decomposition of the 17 kinds of toxic dioxins was 98.98%, and the percentage of decomposition of dioxin toxic equivalent quantity was 98%; and 2) in the fly ash cooled by slow cooling after the treatment, the concentration of 17 kinds of toxic dioxins was 249 ng/kg, and the concentration of toxic equivalent quantity was 107 ng-TEQ/kg, and the total percentage of decomposition of the 17 kinds of toxic dioxins was 99%, and the percentage of decomposition of dioxin toxic equivalent quantity was 98.35%.

It's indicated from the above examples that the process of the invention can be used for the destruction of the dioxins in the incineration fly ash to reduce the toxic equivalent quantity to 100 ng-TEQ/kg or lower. The process of the invention is also quite good at the decomposition of the contamination of PCBs in soil.

EXAMPLE 10

In the contaminated soil at one e-waste treatment plant, the total content of PBBs was 14.79 ug/kg. While the process of the invention was used to treat the contaminated soil, the soil and water were mixed at a weight ratio of 1:3.3, then saturated Fe(NO3)2 solution and saturated Fe2(SO4)3 solution were added at a molar ratio of 1:4 (for Fe2+/Fe3+), and the addition of Fe2+ was followed by Fe3+, to keep the ORP value reach to around 300 mv and finally the total weight of Fe2+ and Fe3+ be around 6 wt % of the weight of the contaminated oil. The formed mixture of slurry was transferred into a high temperature reactor and a small amount of lime was added to adjust the pH of the system to 7~8. The reaction temperature in the high temperature reactor was set at 280° C., and the reaction was continued for 75 mins at saturation pressure. The reacted mixture of soil and water was cooled and the water was separated out to obtain treated solid sample which was dried and the content of PBBs was detected. The results were as follows: the total content of PBBs was 1.48 ug/kg, and the total percentage of decomposition of PBBs was 90.0%.

EXAMPLE 11

While the sludge from one industrial wastewater treatment plant was treated with the process of the invention, in which the total content of PBDEs was 26.5 μg/kg and the content of water was 80%. Solid Fe(NO3)2 was added into the sludge and the mixture was stirred to form a homogenous slurry. The slurry was transferred into a hydrothermal reactor, and heated to 105° C. At this temperature, saturated Fe2(SO4)3 solution was added into the slurry at a molar ratio of 1:2 (for Fe2+/Fe3+), and the ORP value was controlled to be positive by the amount of Fe3+. Finally, the total weight of Fe2+ and Fe3+ was around 8 wt % of the dry weight of sludge, and the pH value of the resultant mixture was 9~10.5 by addition of a small amount of lime. Then the slurry in the hydrothermal reactor was heated to 265° C., and the reaction continued for 80 mins. After removal of water in the reacted mixture by flash evaporation, the left mixture was cooled down, then the aqueous phase and solid phase were separated by filtration. The solid sample was dried, whose content of PBDEs was detected. The results were as follows: the total content of PBBs was 2.17 ug/kg, and the total percentage of decomposition of PBDEs was 91.8%.

EXAMPLE 12

The soil in some place was contaminated by PBBs, and the concentration of PBBs was detected as 4.79 mg/kg (The congeners detected included ten compounds: PBB-3, PBB-15, PBB-18, PBB-52, PBB-101, PBB-153, PBB-180, PBB-194, PBB-206 and PBB-209). While the process of the invention was used to treat the soil, the soil and water were mixed at a weight ratio of 1:5, then FeSO4 and Fe2(NO3)3 in solid form were added to make the molar ratio of Fe2+/Fe3+ to be 3:1, the total weight of FeSO4 and Fe2(NO3)3 to be around 8 wt % of the weight of the soil, and the ORP value to be −300 mv approximately.

The mixture of slurry were transferred into a hydrothermal reactor and the reaction temperature was set at 200° C. The reaction continued for 120 mins and the gas discharged during the process was collected by NaOH solution. At the end of the reaction, the content of water in the mixture was still above 5 wt %. The reacted mixture was cooled down and dried by freeze drying method, and the PBBs in reacted mixture were detected. The results were as follows: the concentration of PBBs was 1.23 ug/kg, and the percentage of decomposition of PBBs was 74.32%.

The foregoing description has described the preferred embodiments of the invention in detail. It should be understood that the skilled in the art can make various modifications and changes according to the invention without any creative work. Therefore, all technical proposals that could be obtained through logic analysis, reasoning or limited experiments by those skilled in the art in accordance with the conception of the invention on the basic of prior in art, should be within the scope determined by the claims.

What is claimed is:

1. A process for eliminating or reducing persistent organic pollutants contained in particles, comprising treating the persistent organic pollutants contained in the particles under hydrothermal conditions in the presence of $Fe^{2+}$ and $Fe^{3+}$.

2. The process according to claim 1, wherein the molar ratio of the Fe2+ to the Fe3+ is 1:4~3:1, preferably 1:3~1.5:1, and the total amount of the Fe2+ and the Fe3+ is 1 wt % ~8 wt % of the particles.

3. The process according to claim 2, wherein the particles and water, Fe2+ salt and Fe3+ salt are formed to a mixture of slurry, which is reacted at the temperature of 180~300° C.

4. The process according to claim 3, wherein the particles and water are mixed to form the slurry firstly and Fe3+ is added into the slurry, and then Fe2+ is added into the slurry, and the ORP value of the final slurry is no higher than 300 mv.

5. The process according to claim 3, wherein the particles and water are mixed to form the slurry firstly and Fe2+ is added into the slurry, and then Fe3+ is added into the slurry, and the ORP value of the final slurry is no less than −300 mv.

6. The process according to claim 3, wherein the weight ratio of the particles to the water is 1:1~1:5, preferably 1:1.5~1:3.5.

7. The process according to claim 3, wherein the particles are mixed with the Fe2+ salt and the Fe3+ salt firstly, and then the water is added to form the mixture of slurry, and the weight ratio of the particles to the water is 1:1~1:5.

8. The process according to claim 1, wherein the Fe2+ salt is selected from a group consisting of a ferrous sulfate, a ferrous chloride, a ferrous nitrate and the hydrates thereof; and the Fe3+ salt is selected from a group consisting of a ferric sulfate, a ferric chloride, a ferric nitrate and the hydrates thereof.

9. The process according to claim 1, wherein the mixture of slurry is reacted under a condition of sealed or pressure controlled, and the residual water is no less than 5 wt % of the mixture after the reaction.

10. The process according to claim 9, wherein the mixture of slurry is reacted for 20~200 minutes, so that the percentage of decomposition of the persistent organic pollutants is no less than 70%.

11. The process according to claim 1, wherein the process further comprises the following steps:
the reacted mixture being cooled; and
then a solid-liquid separation of the reacted mixture being carried out by directly keeping the retained liquid of the reacted mixture and by a spontaneous evaporation of water, or by filtration, pressure filtration or centrifugation; and the obtained filter cake being kept till the requirement of moisture content is met and then used as building material or disposed directly in landfill.

12. The process according to claim 11, wherein when the particles contain heavy metal pollutants at the same time, the reacted mixture is mixed with a heavy metal stabilizer to stabilize the heavy metals during the cooling and after cooled.

13. The process according to claim 1, wherein the persistent organic pollutants are dioxin PCDD/Fs, organochlorine pesticides or polychlorinated biphenyls PCBs, PBBs and PBDEs, and the particles are incineration fly ash generated from an incinerator, soil or sediments contaminated by organochlorine pesticide, soil contaminated by PCBs, soil contaminated by PBBs and PBDEs, sludge and residue containing PBBs and PBDEs, soil which needs to be remedied in an out-of-use landfill, or bottom mud in a river channel or sediments in a gulf contaminated by the persistent organic pollutants.

* * * * *